United States Patent
Kim et al.

(10) Patent No.: US 11,541,680 B2
(45) Date of Patent: Jan. 3, 2023

(54) PHOTONIC CRYSTAL FILM, METHOD FOR MANUFACTURING SAME, AND ANTI-FORGERY ARTICLE COMPRISING SAME

(71) Applicant: KOREA MINTING, SECURITY PRINTING & ID CARD OPERATING CORP., Daejeon (KR)

(72) Inventors: Shin-hyun Kim, Daejeon (KR); Gun Ho Lee, Daejeon (KR); Won Gyun Choe, Daejeon (KR); Soo Dong Kim, Daejeon (KR); Ju Hee Kang, Daejeon (KR); Hong Keon Kim, Daejeon (KR); Hyun Soo Kim, Daejeon (KR); E Den Kim, Gwangju (KR)

(73) Assignee: Korea Minting, Security Printing & ID Card Operating Corp., Daejeon (KR)

( * ) Notice: Subject to any disclaimer, the term of this patent is extended or adjusted under 35 U.S.C. 154(b) by 453 days.

(21) Appl. No.: 16/606,452

(22) PCT Filed: Apr. 18, 2018

(86) PCT No.: PCT/KR2018/004514
§ 371 (c)(1),
(2) Date: Oct. 18, 2019

(87) PCT Pub. No.: WO2018/194374
PCT Pub. Date: Oct. 25, 2018

(65) Prior Publication Data
US 2021/0107311 A1    Apr. 15, 2021

(30) Foreign Application Priority Data

Apr. 18, 2017  (KR) .................. 10-2017-0049740
May 18, 2017  (KR) .................. 10-2017-0061447

(51) Int. Cl.
*B42D 25/36* (2014.01)
*B29D 7/01* (2006.01)
(Continued)

(52) U.S. Cl.
CPC ............... *B42D 25/29* (2014.10); *B29D 7/01* (2013.01); *B32B 27/18* (2013.01); *B42D 25/36* (2014.10);
(Continued)

(58) Field of Classification Search
CPC .......... B42D 25/29; B42D 25/36; B29D 7/01; B32B 27/18; B32B 37/16; B32B 2425/00;
(Continued)

(56) References Cited

U.S. PATENT DOCUMENTS

2005/0233153 A1* 10/2005  Qin .................... B32B 23/00
                                                 428/423.1
2010/0315703 A1  12/2010  Purdy et al.
(Continued)

FOREIGN PATENT DOCUMENTS

CN    104672733 A    6/2015
CN    105348457 A    2/2016
(Continued)

OTHER PUBLICATIONS

English translation for KR-20140026766-A, Choe (Year: 2014).*
(Continued)

*Primary Examiner* — Michael H Caley
*Assistant Examiner* — Jonathan Y Jung
(74) *Attorney, Agent, or Firm* — Knobbe, Martens, Olson & Bear LLP

(57) ABSTRACT

A photonic crystal film, a method for manufacturing the photonic crystal film, and an anti-forgery article comprising the photonic crystal film are disclosed. The photonic crystal film includes a polyurethane-based polymer matrix and
(Continued)

colloidal particles dispersed in the polyurethane-based polymer matrix and arranged in a crystal lattice structure. The colloidal particles includes one or more selected from metal nanoparticles, metal oxide nanoparticles, organic nanoparticles, and carbon structure nanoparticles.

17 Claims, 3 Drawing Sheets

(51) Int. Cl.
    *G02B 1/00* (2006.01)
    *G02B 1/04* (2006.01)
    *B42D 25/29* (2014.01)
    *B32B 27/18* (2006.01)
    *C08J 5/18* (2006.01)

(52) U.S. Cl.
    CPC ............... *C08J 5/18* (2013.01); *G02B 1/005* (2013.01); *G02B 1/04* (2013.01)

(58) Field of Classification Search
    CPC ..... B32B 2429/00; C08J 5/18; C08J 2333/00; C08J 2375/14; G02B 1/005; G02B 1/04; C08K 2201/011
    See application file for complete search history.

(56) References Cited

U.S. PATENT DOCUMENTS

| | | | |
|---|---|---|---|
| 2011/0122494 A1* | 5/2011 | Sherman | G09F 13/16 359/530 |
| 2012/0161431 A1 | 6/2012 | Vulpius et al. | |
| 2015/0037535 A1 | 2/2015 | Akimoto et al. | |
| 2015/0076808 A1* | 3/2015 | Kim | B32B 27/08 283/85 |
| 2016/0024341 A1* | 1/2016 | Kang | B29D 7/01 427/558 |
| 2016/0039968 A1* | 2/2016 | Rukavina | C08G 18/725 428/221 |
| 2016/0178493 A1 | 6/2016 | Kawanaka et al. | |
| 2016/0202046 A1 | 7/2016 | Kawanaka et al. | |

FOREIGN PATENT DOCUMENTS

| | | |
|---|---|---|
| CN | 105452912 A | 3/2016 |
| CN | 105659118 A | 6/2016 |
| CN | 106082119 A | 11/2016 |
| CN | 106381520 A | 2/2017 |
| CN | 106547040 A | 3/2017 |
| CN | 107119327 A | 9/2017 |
| JP | 2001-042144 A | 2/2001 |
| JP | WO2009041646 A1 | 4/2009 |
| JP | 2012-500415 A | 1/2012 |
| JP | 2018039904 A | 3/2018 |
| KR | 10-2006-0113645 A | 11/2006 |
| KR | 10-2014-0026766 A | 3/2014 |
| KR | 20140026766 A * | 3/2014 |
| KR | 10-2015-0031862 A | 3/2015 |
| KR | 10-1724945 B1 | 4/2017 |
| KR | 20140026766 A * | 9/2018 |

OTHER PUBLICATIONS

International Search Report of corresponding PCT Application No. PCT/KR2018/004514—4 pages (dated Jul. 20, 2018).
Japanese Office Action in Application No. 2019556642 dated Aug. 11, 2021 in 3 pages.
Office Action of Japanese Patent Application No. 2019-556642—10 pages (dated Dec. 9, 2020).
Partial Supplementary European Search Report of European Patent Application No. 18788460.6—11 pages (dated Nov. 24, 2020).
Office Action of Chinese Patent Application No. 201880025398.0—8 pages (dated Jan. 22, 2021).

* cited by examiner

PHOTONIC CRYSTAL FILM, METHOD FOR MANUFACTURING SAME, AND ANTI-FORGERY ARTICLE COMPRISING SAME

TECHNICAL FIELD

The present invention relates to a photonic crystal film, a method for manufacturing the same, and an anti-forgery article comprising the same. More particularly, the present invention relates to a photonic crystal film for a security element that is excellent in visibility by having a high reflectance characteristic in spite of a thin thickness, and is foldable due to significantly increased flexibility, and an anti-forgery article comprising the same.

BACKGROUND ART

A photonic crystal is a material having a crystal lattice in which a matrix and a particle that have different refractive indices are regularly arranged, and refers to a material having a photonic band gap due to periodic changes in dielectric constant at half a wavelength of light.

The photonic band gap controls photons in the photonic crystal in the same manner as in a semiconductor having a band gap of electrons which controls the electrons, and in a case where light having a wide spectrum is incident on the photonic crystal from the outside, only light having a wavelength corresponding to the photonic band gap cannot propagate into a material and is selectively reflected. In a case where such a photonic band gap is present in a visible light region, the selective reflection by the photonic band gap shows as a reflection color.

A regular arrangement of colloidal particles exhibits a reflection color by the same principle and the reflection color is a color corresponding to the photonic band gap of the photonic crystal. The reflection color of the colloidal photonic crystal is determined by a refractive index, a crystal structure, a particle diameter, an interparticle space of each of the materials of a colloid, and a matrix. Accordingly, by controlling these conditions, a photonic crystal having a desired reflection color may be produced.

Meanwhile, a photonic crystal having a film shape may exhibit a reflection color with excellent visibility by increasing a thickness of a film so that a reflectance is increased. However, since a mechanical strength of the photonic crystal film itself is very weak, the photonic crystal film is not easily handled due to durability problems such as easily cracking. Therefore, the photonic crystal film has a limitation to be applied to fields such as banknote and a security document, which are required to have flexibility.

Accordingly, the development of a photonic crystal film that is excellent in visibility by having a high reflectance characteristic and is foldable due to significantly increased flexibility is required.

Korean Patent Laid-Open Publication No. 10-2015-0031862 is provided as a similar related art.

DISCLOSURE

Technical Problem

An object of the present invention is to provide a photonic crystal film for a security element that is excellent in visibility by having a high reflectance characteristic in spite of a thin thickness, and is foldable due to significantly increased flexibility.

In addition, another object of the present invention is to provide a method for manufacturing a photonic crystal film for a security element that is excellent in visibility by having a high reflectance characteristic, and is foldable due to significantly increased flexibility, and an anti-forgery article comprising the photonic crystal film.

Technical Solution

In one general aspect, a photonic crystal film includes: a polyurethane-based polymer matrix; and colloidal particles dispersed in the polyurethane-based polymer matrix and arranged in a crystal lattice structure.

A maximum reflectance of the photonic crystal film may be 10% or more.

A thickness of the photonic crystal film may be 10 to 200 μm.

The polyurethane-based polymer matrix may be formed of a polyurethane-based prepolymer.

A viscosity of the polyurethane-based prepolymer at 80° C. may be 100 to 1,000 cps.

A weight average molecular weight of the polyurethane-based prepolymer may be 500 to 30,000 g/mol.

A difference between a refractive index of the polyurethane-based polymer matrix and a refractive index of the colloidal particles may be 0.02 or more.

The refractive index of the polyurethane-based polymer matrix may be 1.4 to 1.5 and the refractive index of the colloidal particles may be 1.3 to 2.95.

A thickness of the photonic crystal film may be 10 to 200 μm.

An average particle diameter of the colloidal particles may be 10 to 315 nm.

The colloidal particles may satisfy the following Relational Expression 1, $$Da \times 0.95 \leq Ds \leq Da \times 1.05 \qquad \text{Relational Expression 1}$$

(in Relational Expression 1, Ds is a particle diameter (nm) of the colloidal particles and Da is an average particle diameter (nm) of the colloidal particles).

The colloidal particles may be one or two or more selected from metal nanoparticles, metal oxide nanoparticles, organic nanoparticles, and carbon structure nanoparticles.

The photonic crystal film may be used for a security element.

In another aspect, there is provided a method for manufacturing a photonic crystal film, the method including: applying a dispersion liquid containing a polyurethane-based prepolymer, colloidal particles, and a photoinitiator on a substrate or injecting a dispersion liquid containing a polyurethane-based prepolymer, colloidal particles, and a photoinitiator between two parallel transparent flat plates and irradiating the dispersion liquid with light.

The dispersion liquid may be applied on the substrate or injected between the two transparent flat plates at a temperature of 60 to 100° C.

In still another aspect, there is provided a method for manufacturing a photonic crystal film, the method including: a) applying a dispersion liquid containing a multi-functional compound containing two or more photopolymerizable functional groups, colloidal particles, and a photoinitiator on a first substrate and covering the first substrate on which the dispersion liquid is applied with a second substrate; b) aging the applied dispersion liquid at a temperature of 30° C. to lower than 200° C.; and c) irradiating the aged dispersion liquid with light to polymerize the dispersion liquid, wherein at least one selected from the first substrate and the second substrate is a transparent substrate.

The aging may be performed for 10 minutes or longer.

The aging may be performed at a temperature of 30° C. to 100° C.

In the aging, the temperature may be increased by 1° C./min to 10° C./min up to 30° C. to lower than 200° C.

In still another aspect, an anti-forgery article comprises the photonic crystal film described above or a photonic crystal film obtained by the manufacturing method described above.

Advantageous Effects

The photonic crystal film according to the present invention has significantly increased flexibility. In addition, the colloidal particles are not easily separated from the polymer matrix due to an excellent adhesive strength between the polymer and the colloidal particles. Accordingly, damage to the film, such as easily cracking or peeling off, may be prevented, such that durability of the film may be improved. In addition, the film may be easily handled. Therefore, the film is advantageous in that it may be applied to an anti-forgery article, such as a banknote and a security document, which is required to have flexibility.

The method for manufacturing a photonic crystal film according to the present invention is advantageous in that the colloidal particles may be quickly self-assembled in the polymer matrix, and the maximum reflectance of the manufactured photonic crystal film may be significantly increased as the colloidal particles are extremely and uniformly arranged in a crystal lattice structure when being self-assembled.

In particular, unlike the existing manner in which a large amount of time is required for injecting a dispersion liquid between two transparent substrates by using a capillary force, in the present invention, the photonic crystal film may be manufactured in a very simple manner in which the dispersion liquid is applied on one substrate and then the other substrate is placed on the one substrate. Therefore, the time required to manufacture the film is significantly shortened, resulting in significant improvement of manufacturing efficiency.

In addition, the method for manufacturing a photonic crystal film also includes aging of the dispersion liquid, whereby the multi-functional compound having a high viscosity may be also used.

BEST MODE

Figure 1:
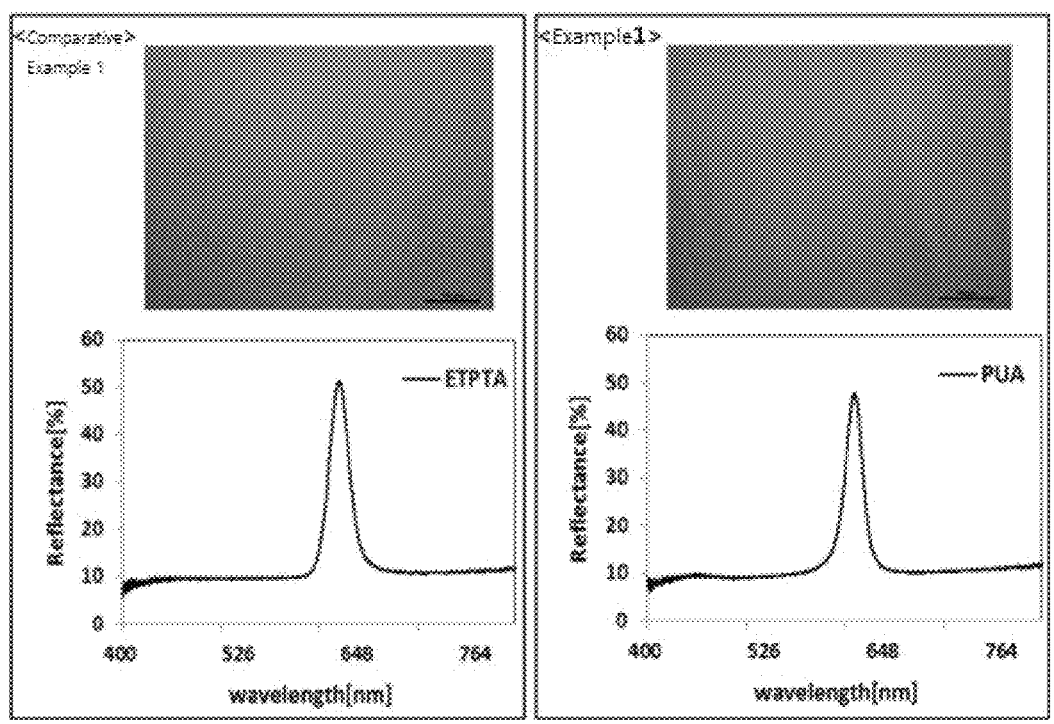
FIG. 1 illustrates the results obtained by measuring a reflectance of a photonic crystal film for a security element manufactured according to Comparative Example 1 and Example 1.
Figure 2:
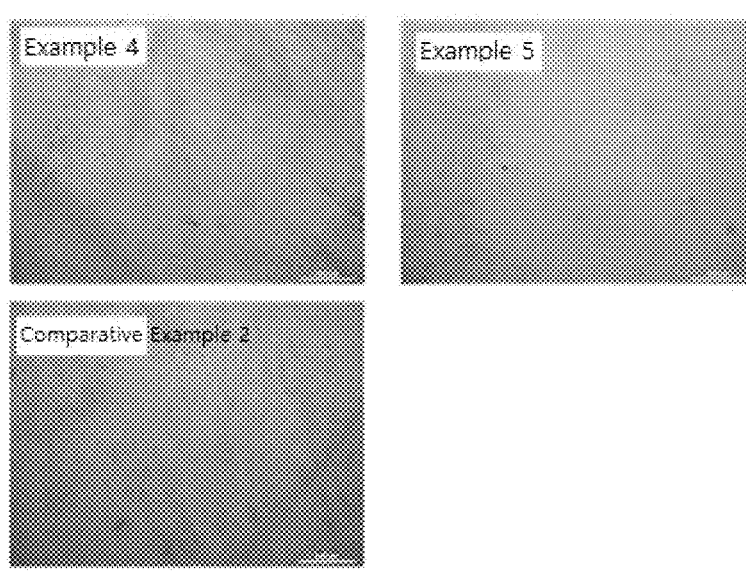
FIG. 2 illustrates a photograph obtained by observing a photonic film manufactured according to Examples 4 and 5 and Comparative Example 2 in a visible light range with a reflecting microscope.

Hereinafter, a photonic crystal film according to the present invention, a method for manufacturing the same, and an anti-forgery article comprising the same are described in detail with reference to the accompanying drawings. The drawings to be described below are provided by way of example so that the idea of the present invention can be sufficiently transferred to those skilled in the art. Therefore, the present invention is not be limited to the drawings suggested below but may be modified in many different forms. In addition, the drawings suggested below will be exaggerated in order to clarify the idea of the present invention. In addition, the same components are denoted by the same reference numerals throughout the specification.

Technical terms and scientific terms used in the present specification have the general meaning understood by those skilled in the art to which the present invention pertains unless otherwise defined, and a description for the known function and configuration obscuring the present invention will be omitted in the following description and the accompanying drawings.

In the present invention, a photonic crystal film has a reflectance spectrum with respect to a specific wavelength.

A first aspect of the present invention provides a photonic crystal film including: a polyurethane-based polymer matrix; and colloidal particles dispersed in the polyurethane-based polymer matrix and arranged in a crystal lattice structure.

According to the first aspect of the present invention, the photonic crystal film includes the polyurethane-based polymer matrix, such that it is possible to prevent the film from being easily cracked or damaged when a high physical transformation is applied. In addition, flexibility of the photonic crystal film is significantly increased, such that the photonic crystal film may be actually applied to a foldable material without damaging the film due to a high physical transformation such as folding. In addition, physical properties of the photonic crystal film are not degraded even though deformation is repeatedly applied. In addition, the original form of the photonic crystal film is maintained, such that when the photonic crystal film is applied as a security element, excellent reflectance properties essentially required for the photonic crystal film may be constantly kept. Accordingly, the photonic crystal film has characteristics that may keep properties as a security element. Furthermore, the colloidal particles are not easily separated from the matrix due to an excellent adhesive strength between the polyurethane-based polymer and the colloidal particles. Therefore, durability of the film is improved and the film may be easily handled. Such a photonic crystal film is advantageous in that it may be applied to an anti-forgery article, such as a banknote and a security document, which is required to have flexibility, as a security element.

According to the first aspect of the present invention, a maximum reflectance of the photonic crystal film may be preferably 10% or more, more preferably 20% or more, and still more preferably 40% or more. The photonic crystal film has the above properties, such that the photonic crystal film has excellent visibility and identifiability. Such a photonic crystal film has a sufficient reflectance even as compared to the existing photonic crystal film exhibiting an excellent reflectance. Therefore, the photonic crystal film may be sufficiently used for a security element. The maximum reflectance of the photonic crystal film according to the first aspect may be preferably 48% or more. An upper limit of the maximum reflectance is not particularly limited and may be actually 60% or less. In this case, since a wavelength region in which the reflectance is maximized may vary depending on a diameter of the colloidal particles to be used, the wavelength region also cannot be limited. As a specific example, when spherical silica having an average particle diameter of 170 nm is used as the colloidal particles, the reflectance of the photonic crystal film may be maximized in a wavelength region of 530 to 535 nm and a reflection color may be a greenish color. Alternatively, when spherical silica having an average particle diameter of 200 nm is used as the colloidal particles, the reflectance of the photonic crystal film may be maximized in a wavelength region of 620 to 630 nm and a reflection color may be a reddish color.

According to the first aspect of the present invention, it is preferable that the photonic crystal film has an adequate thickness range to have extremely excellent flexibility enough to be foldable. Specifically, a thickness of the photonic crystal film may be 10 to 200 μm. In the above range, the photonic crystal film for a security element has significantly excellent flexibility and a mechanical strength of the photonic crystal film is adequately maintained, such that the original form of the photonic crystal film for a security element may be maintained without damaging the film even under an environment in which a high physical deformation is repeatedly applied. The thickness of the photonic crystal film for a security element may be more preferably 30 to 150 μm and still more preferably 50 to 100 μm.

According to the first aspect of the present invention, it is preferable to adequately select the polymer matrix and the colloidal particles in terms of achieving the desired effects of the present invention.

According to the first aspect of the present invention, the polyurethane-based polymer matrix may be formed of a polyurethane-based prepolymer. The polyurethane-based prepolymer whose properties are adjusted to secure flexibility enough to be foldable and to have an increased adhesive strength with the colloidal particles may be used in order to prevent the photonic crystal film from being damaged. In this case, the polyurethane-based prepolymer is a polymer containing a curable functional group and having a relatively low polymerization degree, and may mean a polyurethane-based polymer before being formed to a polyurethane-based polymer matrix.

Preferably, the polyurethane-based prepolymer according to the first aspect of the present invention may have an adequate viscosity range at an adequate temperature. By doing so, the photonic crystal film for a security element which has a very thin thickness may be manufactured. In addition, the polyurethane-based polymer matrix having extremely excellent flexibility is formed, such that it is possible to prevent the photonic crystal film from being easily cracked or damaged. Furthermore, when manufacturing the photonic crystal film, as illustrated later, a dispersion liquid is easily injected between two transparent flat plates, such that the process time required for manufacturing the film may be shortened.

According to the first aspect of the present invention, a viscosity of the polyurethane-based prepolymer at 80° C. may be 100 to 1,000 cps. The viscosity of the polyurethane-based prepolymer at 80° C. may be preferably 200 to 800 cps and more preferably 300 to 600 cps. On the other hand, when the viscosity of the polyurethane-based prepolymer at 80° C. is more than 1,000 cps, it may be difficult to inject the dispersion liquid between the two transparent flat plates due to an insufficient fluidity of the dispersion liquid. Therefore, it may be difficult to produce a photonic crystal having a film shape.

In addition, a weight average molecular weight of the polyurethane-based prepolymer may be 500 to 30,000 g/mol, specifically, 800 to 10,000 g/mol, and more specifically, 1,000 to 5,000 g/mol. In the above range, the polyurethane-based polymer matrix having extremely excellent flexibility may be easily formed. In this case, the weight average molecular weight is measured by a gel permeation chromatography (1260 Infinity, manufactured by Agilent Technologies, Inc.). In this case, a column obtained by connecting two PLgel 5 um MIXED-D columns (300×7.5 mm) and one PLgel 5 um column (50×7.5 mm) to each other is used, and tetrahydrofuran (THF) is used as a solvent.

According to the first aspect of the present invention, the polyurethane-based prepolymer may contain at least one photocurable functional group, and the photocurable functional group is not particularly limited as long as it may be polymerized by light irradiation. A specific example of the curable functional group includes an ethylenically unsaturated group such as a vinyl group, an acrylate group, or a methacrylate group.

The polyurethane-based prepolymer may be produced by a polymerization reaction of a polyisocyanate-based compound with a polyol-based compound in a range in which the physical properties for realizing the present invention such as flexibility, a refractive index, and a reflectance are not impaired.

The polyisocyanate-based compound may be one or two or more selected from the group consisting of aromatic polyisocyanate, aliphatic polyisocyanate, and alicyclic polyisocyanate. Specific examples of the polyisocyanate-based compound include aromatic polyisocyanate such as 1,3-phenylene diisocyanate, 1,4-phenylene diisocyanate, 2,4-tolylenediisocyanate (TDI), 2,6-tolylenediisocyanate, 4,4'-diphenylmethane diisocyanate (MDI), 2,4-diphenylmethane diisocyanate, 4,4'-diisocyanatobiphenyl, 3,3'-dimethyl-4,4'-diisocyanatobiphenyl, 3,3'-dimethyl-4,4'-diisocyanato diphenylmethane, 1,5-naphthalene diisocyanate, 4,4',4"-triphenylmethane triisocyanate, m-isocyanatophenyl sulfonyl isocyanate, or p-isocyanatophenyl sulfonyl isocyanate; aliphatic polyisocyanate such as ethylene diisocyanate, tetramethylene diisocyanate, hexamethylene diisocyanate (HDI), dodecamethylene diisocyanate, 1,6,11-undecane triisocyanate, 2,2,4-trimethylhexamethylene diisocyanate, lysine diisocyanate, 2,6-diisocyanato methyl caproate, bis(2-isocyanatoethyl) fumarate, bis(2-isocyanatoethyl) carbonate, or 2-isocyanatoethyl-2,6-diisocyanato hexanoate; and alicyclic polyisocyanate which is one or two or more selected from the group consisting of isophorone diisocyanate (IPDI), 4,4'-dicyclohexylmethane diisocyanate (hydrogenated MDI), cyclohexylene diisocyanate, methylcyclohexylene diisocyanate (hydrogenated TDI), bis(2-isocyanatoethyl)-4-diclohexene-1, 2-dicarboxylate, 2,5-norbornane diisocyanate and 2,6-norbornane diisocyanate, but are not limited thereto.

As the polyol-based compound, polyester polyol, polyether polyol, and a mixture thereof may be used. Specific examples of the polyol-based compound include polyester polyol such as polyethylene adipate, polybutylene adipate, poly(1,6-hexaadipate), polydiethylene adipate, or poly(e-caprolactone); and polyether polyol such as polyethylene glycol, polydiethylene glycol, polytetramethylene glycol, or polyethylene propylene glycol, but are not limited thereto.

According to the first aspect of the present invention, the colloidal particles is a material which is dispersed in the polymer matrix and has a crystal lattice structure when manufacturing the photonic crystal film so that the photonic crystal film actually has photonic crystal characteristics. Any colloidal particles may be used without particular limitation as long as it has a certain diameter and is commonly used in the art.

As a specific example, the colloidal particles may be one or two or more selected from the group consisting of metal nanoparticles, metal oxide nanoparticles, organic nanoparticles, and carbon structure nanoparticles. More specifically, the metal nanoparticles may be one selected from the group consisting of gold (Au), silver (Ag), copper (Cu), nickel (Ni), zinc (Zn), aluminum (Al), tin (Sn), palladium (Pd), platinum (Pt), and silicon (Si), or mixtures thereof, or alloys thereof, and the metal oxide nanoparticles may be oxide of the metal nanoparticles. The organic nanoparticles may be one or two or more polymer nanoparticles selected from polyethylene, polypropylene, polyacrylate, polymethyl methacrylate, polystyrene, polydimethylsiloxane, polyimide, polyethylene terephthalate, polyethylene naphthalate, polyethylenesulfone, and polycarbonate, and the carbon structure nanoparticles may be graphite.

Any diameter of the colloidal particles may be used without particular limitation as long as it is commonly used in the art. Specifically, an average particle diameter of the colloidal particles may be 10 to 315 nm. More specifically, the diameter of the colloidal particles may be adjusted depending on a volume occupied by the colloidal particles in the photonic crystal film. That is, the diameter of the colloidal particles to be used may be adjusted depending on a volume fraction of the colloidal particles. When the volume fraction of the colloidal particles is 5 to 25 vol % based on the total volume of the photonic crystal film, the average particle diameter of the colloidal particles may be 10 to 180 nm, when the volume fraction of the colloidal particles is more than 25 to 60 vol % based on the total volume of the photonic crystal film, the average particle diameter of the colloidal particles may be more than 180 nm to 250 nm, and when the volume fraction of the colloidal particles is more than 60 to 90 vol % based on the total volume of the photonic crystal film, the average particle diameter of the colloidal particles may be more than 250 nm to 315 nm, but the present invention is not limited thereto.

As a more specific example, when the volume fraction of the colloidal particles is 33 vol % based on the total volume of the photonic crystal film, the average particle diameter of the colloidal particles may be 140 to 220 nm, when the volume fraction of the colloidal particles is 5 vol % based on the total volume of the photonic crystal film, the average particle diameter of the colloidal particles may be 50 to 120 nm, and when the volume fraction of the colloidal particles is 90 vol % based on the total volume of the photonic crystal film, the average particle diameter of the colloidal particles may be 180 to 315 nm. It is advantageous to secure visibility of the photonic crystal film within the above range, and in a case where the volume fraction of the colloidal particles is out of the above range, the photonic crystal film has a wavelength out of a reflection wavelength of a visible light range, such that it may be difficult to secure the visibility of the photonic crystal film.

In this case, a shape of the colloidal particles is not particularly limited, but it may be preferable to use spherical nanoparticles.

In particular, in terms of forming a crystal lattice structure in which the colloidal particles are dispersed in the polymer matrix and very uniformly and regularly arranged to secure an excellent reflectance, the colloidal particles may satisfy the following Relational Expression 1.

$$Da \times 0.95 \leq Ds \leq Da \times 1.05 \quad \text{Relational Expression 1}$$

(In Relational Expression 1, Ds is a particle diameter (nm) of the colloidal particles and Da is an average particle diameter (nm) of the colloidal particles.)

That is, when the average particle diameter of the colloidal particles is 200 nm, a particle diameter of each colloidal particle may satisfy 190 to 210 nm. In this case, the particle diameter and the average particle diameter (D50) of the colloidal particles may be calculated from a particle size distribution, and the particle size distribution may be measured by using a laser particle size analyzer.

As such, by using the colloidal particles having an extremely uniformed particle diameter, it is possible to form the crystal lattice structure in which the colloidal particles are regularly arranged with high precision. Accordingly, the photonic crystal film has a further excellent reflectance, such that the photonic crystal film may exhibit excellent visibility.

In addition, since the photonic crystal is a material having a crystal lattice in which a polymer matrix and a particle that have different refractive indices are regularly arranged, a refractive index of the polymer matrix and a refractive index of the colloidal particles are also very important in the photonic crystal film.

As a preferred embodiment, a difference in refractive index between the polymer matrix and the colloidal particles may vary depending on a material to be used. As a specific example, the difference in refractive index between the polymer matrix and the colloidal particles may be 0.02 or more and more preferably 0.03 to 1.55. In the above range, the photonic crystal film may have an excellent reflectance spectrum with respect to a specific wavelength. The maximum reflectance of the photonic crystal film may be 10% or more, specifically, 35% or more, more specifically, 45% or more, and still more specifically, 50% or more.

In this case, the refractive index of the polymer matrix may be 1.4 to 1.5 and the refractive index of the colloidal particles may be 1.3 to 2.95. As more specific and non-limiting examples, the refractive index of the polymer matrix may be 1.45 to 1.49 and preferably 1.47 to 1.49 and the refractive index of the colloidal particles may vary depending on the type of colloidal particles. As a specific example, in a case where the colloidal particles is silica nanoparticles, a refractive index of the silica nanoparticles may be 1.43 to 1.5 and more specifically 1.45. In this case, the refractive index is measured using a prism coupler. Specifically, a reflectance is measured in a wavelength range in a visible region, an optical constant of Cauchy's dispersion formula is calculated by the least squares method (curve fitting) using Cauchy's dispersion formula as the approximate expression of the wavelength dispersion of refractive index to measure the refractive index at a wavelength of 550 nm and a temperature of 23° C.

A second aspect of the present invention provides a method for manufacturing a photonic crystal film, the method including applying a dispersion liquid containing a polyurethane-based prepolymer, colloidal particles, and a photoinitiator on a substrate or injecting a dispersion liquid containing a polyurethane-based prepolymer, colloidal particles, and a photoinitiator between two parallel transparent flat plates and irradiating the dispersion liquid with light.

According to the second aspect of the present invention, by the manufacturing method, a photonic crystal film may be manufactured by applying a dispersion liquid on a substrate and then photocuring the dispersion liquid or a photonic crystal film for a security element may be manufactured by injecting a dispersion liquid between two transparent flat plates having a gap as thick as a desired film and then photocuring the dispersion liquid. Preferably, in the case where the photocurable film is manufactured by injecting a dispersion liquid between two transparent flat plates, a thickness of the film may be easily adjusted, and it is preferable in terms of manufacturing a film having a very uniform thickness.

According to the second aspect of the present invention, a volume ratio of the polyurethane-based prepolymer to the colloidal particles in the dispersion liquid may be 0.9:0.1 to 0.5:0.5. In the above range, a repulsive force between the colloidal particles effectively acts, such that the colloidal particles may be arranged in a crystal lattice structure. In addition, the photonic crystal film has a reflectance spectrum with respect to a specific wavelength, such that the photonic crystal film has excellent visibility and identifiability. The volume ratio of the polyurethane-based prepolymer to the colloidal particles in the dispersion liquid may be preferably 0.8:0.2 to 0.6:0.4. In the above range, the colloidal particles are more effectively arranged in a crystal lattice structure.

According to the second aspect of the present invention, the photoinitiator is not particularly limited as long as the polyurethane-based prepolymer may be sufficiently photocured. For example, 0.3 to 3 wt % of the photoinitiator may be added based on the volume of the polyurethane-based prepolymer. It is more preferable that 0.5 to 2 wt % of the photoinitiator is added in terms of not reducing the reflectance of the photonic crystal film for a security element.

In this case, since the polyurethane-based prepolymer and the colloidal particles are the same as those described above, a duplicated description thereof will be omitted.

The photoinitiator may be used without particular limitation as long as it is commonly used in the art. As a specific example, the photoinitiator may be one or two or more selected from the group consisting of 1-hydroxy-cyclohexyl-phenol-ketone, 2-methyl-1[4-(methylthio)phenyl]-2-morpholinopropan-1-one, benzyl dimethyl ketone, 1-(4-dodecylphenyl)-2-hydroxy-2-methylpropan-1-one, 2-hydroxy-2-methyl-1-phenylpropan-1-one, 1-(4-isopropylphenyl)-2-hydroxy-2-methylpropan-1-one, benzophenone, 2,2-dimethoxy-2-phenylacetophenone, 2,2-diethoxy-2-phenylacetophenone, 2-hydroxy-2-methyl-1-propan-1-one, 4,4'-diethylamino benzophenone, dichlorobenzophenone, 2-methylanthraquinone, 2-ethylanthraquinone, 2-methylthioxanthone, 2-ethylthioxanthone, 2,4-dimethylthioxanthone, and 2,4-diethylthioxanthone, but is not limited thereto.

When the dispersion liquid is prepared, the dispersion liquid may be applied on the substrate or may be injected between the two transparent flat plates. The application method may be used without particular limitation as long as it is commonly used in the art. Examples of the application method include a spin coating method, a doctor blading method, a dip coating method, a spray coating method, a casting method, a screen printing method, an ink jet printing method, an electro-hydrodynamic printing method, a microcontact printing method, an imprinting method, a gravure printing method, a reverse offset printing method, or a gravure offset printing method. In addition, the injection method is also not particularly limited. As an example, the dispersion liquid may be filled between the two transparent flat plates by a capillary force.

At this time, the dispersion liquid may be applied on the substrate or injected between the two transparent flat plates at a temperature of 60 to 100° C. In the above range, the polyurethane-based prepolymer has an adequate viscosity, such that the dispersion liquid may be applied on the substrate at an adequate thickness. In addition, the dispersion liquid is easily injected between the two transparent flat plates, such that the process time required for manufacturing the film may be shortened.

In this case, any substrate may be used without particular limitation as long as the photonic crystal film may be easily separated from the substrate. Preferably, a glass plate and the like may be used as the substrate.

The gap between the two transparent flat plates may be adjusted depending on a desired thickness of the film.

Specifically, the gap between the two transparent flat plates may be 30 to 150 μm and more preferably 50 to 100 μm.

In addition, it is preferable to select the transparent flat plate which allows light to be transmitted therethrough to enable efficient photopolymerization of the polyurethane-based prepolymer, and is easily separated from the photonic crystal film for a security element. As a specific example, a glass plate may be used, but is not limited thereto.

After application or injection of the dispersion liquid, the dispersion liquid is photopolymerized by light irradiation, thereby manufacturing a photonic crystal film for a security element, the photonic crystal film including a polyurethane-based polymer matrix; and colloidal particles dispersed in the polyurethane-based polymer matrix and arranged in a crystal lattice structure.

In this case, the light may be ultraviolet rays, and more specifically, may be light having a wavelength region of 200 to 500 nm. More preferably, the light may be light having a wavelength region of 254 to 400 nm, and still more preferably, the light may be light having a wavelength region of 330 to 370 nm. However, the present invention is not limited thereto. In addition, the light may be a mixed light with several wavelengths or a single wavelength light.

According to the second aspect of the present invention, conditions of the light irradiation may be controlled depending on a size of the photonic crystal film for a security element and the like, and the light irradiation may be performed until the dispersion liquid containing the polyurethane-based prepolymer is sufficiently cured. As a non-limiting example, the light irradiation may be performed by irradiating a light having an output of 5 to 20 mW/cm$^2$ for 3 to 30 seconds, and more preferably, light irradiation may be performed by irradiating a light having an output of 7 to 15 mW/cm$^2$ for 5 to 10 seconds, but the present invention is not limited thereto.

Next, it is also possible to perform an additional process of separating the photonic crystal film for a security element manufactured on the substrate or between the transparent flat plates and removing an unreacted product which is not cured.

A third aspect of the present invention provides a method for manufacturing a photonic crystal film, the method including: a) applying a dispersion liquid containing a multi-functional compound containing two or more photopolymerizable functional groups, colloidal particles, and a photoinitiator on a first substrate and covering the first substrate on which the dispersion liquid is applied with a second substrate; b) aging the applied dispersion liquid at a temperature of 30° C. to lower than 200° C.; and c) irradiating the aged dispersion liquid with light to polymerize the dispersion liquid, wherein at least one selected from the first substrate and the second substrate is a transparent substrate.

The photonic crystal film may be manufactured by a known method such as an infiltration method in which a dispersion liquid is injected by itself between two glass substrates spaced apart from each other at a certain interval by using a capillary force (capillarity) generated by the two glass substrates; however, since it takes a long period of time to inject the dispersion liquid between the two glass substrates, the improvement of film manufacturing efficiency is limited. In addition, since it is difficult to perform the work at a high temperature, a dispersion having a high viscosity cannot be used.

In order to solve the problems, the manufacturing method according to the third aspect of the present invention is provided to further quickly manufacture the photonic crystal film with only a simple application and covering manner, and to improve the maximum reflectance.

According to the third aspect of the present invention, in the method for manufacturing a photonic crystal film, the dispersion liquid is applied and then aging is performed at a temperature of 30° C. to lower than 200° C., such that the colloidal particles may be quickly self-assembled in a multi-functional compound matrix. The maximum reflectance of the manufactured photonic crystal film may be significantly increased as the colloidal particles are arranged in an extremely uniformed crystal lattice structure when being self-assembled.

In particular, unlike the existing manner in which a large amount of time is required for injecting the dispersion liquid between the two transparent substrates by using a capillary force, in the present invention, the photonic crystal film may be manufactured in a very simple manner in which the dispersion liquid is applied on one substrate and then the other substrate is placed on the one substrate, such that the time required to manufacture the film is significantly shortened, resulting in significant improvement of manufacturing efficiency.

In addition, the dispersion liquid is aged at a temperature of 30° C. to lower than 200° C., such that the multi-functional compound having a relatively high viscosity may be also used without limitation in using the multi-functional compound having a low viscosity.

Hereinafter, the method for manufacturing a photonic crystal film according to the third aspect of the present invention will be described in more detail.

First, a) applying of a dispersion liquid containing a multi-functional compound containing two or more photopolymerizable functional groups, colloidal particles, and a photoinitiator on a first substrate and covering of the first substrate on which the dispersion liquid is applied with a second substrate may be performed. At this time, since the applied dispersion liquid is required to be photopolymerized, it is preferable that at least one selected from the first substrate and the second substrate is necessarily a transparent substrate.

According to the third aspect of the present invention, in the manufacturing method, the photonic crystal film may be manufactured in a very simple manner in which the dispersion liquid is applied on one substrate and then the other substrate is placed on the one substrate, such that the time required to manufacture the film is significantly shortened, resulting in significant improvement of manufacturing efficiency.

According to the third aspect of the present invention, the dispersion liquid is not particularly limited, but a volume ratio of the multi-functional compound to the colloidal particles may be 0.9:0.1 to 0.5:0.5. In the above range, a repulsive force between the colloidal particles effectively acts, such that the colloidal particles may be arranged in a crystal lattice structure. In addition, the photonic crystal film has a reflectance spectrum in a specific wavelength, such that the photonic crystal film has excellent visibility and identifiability. In terms of more efficiently arranging the colloidal particles in a crystal lattice structure, a volume ratio of the multi-functional compound to the colloidal particles may be more preferably 0.8:0.2 to 0.6:0.4.

Since the photoinitiator and the colloidal particles are the same as those described above, a duplicated description thereof will be omitted.

According to the third aspect of the present invention, the multi-functional compound may be a liquid phase at the aging temperature. Specifically, a viscosity of the multi-functional compound at the aging temperature is preferably 1 to 1,000 cps and more preferably 5 to 500 cps.

According to the third aspect of the present invention, the multi-functional compound may be a monomer containing two or more photopolymerizable functional groups or a prepolymer containing two or more photopolymerizable functional groups. Any photopolymerizable functional group may be used without particular limitation as long as it is a polymerizable group which is polymerizable by light irradiation. As an example, the photopolymerizable functional group may be an ethylenically unsaturated group such as a vinyl group, an acrylate group or a methacrylate group. In addition, any multi-functional compound may be used without particular limitation as long as it is polymerizable and may also provide excellent flexibility after polymerization.

More specifically, the multi-functional compound may be one or two or more selected from the group consisting of ethoxylated trimethylolpropane triacrylate (ETPTA), di(trimethylolpropane) tetracrylate, glycerol propoxylate triacrylate, trimethylolpropane ethoxylate triacrylate, trimethylolpropane ethoxylate triacrylate, and a photocurable multi-functional monomer such as trimethylolpropane ethoxylate triacrylate. In addition, an example of the multi-functional compound includes a polyurethane-based prepolymer, but is not limited thereto. Since the polyurethane-based prepolymer is the same as that described in the first aspect, a duplicated description thereof will be omitted.

According to the third aspect of the present invention, the prepared dispersion liquid is applied on the first substrate. The application method is the same as described above. In this case, the first substrate may have a groove formed along a desired shape of the photonic crystal film. A depth of the groove may be adjusted depending on a desired thickness of the photonic crystal film, and as a specific example, the depth of the groove may be 10 to 200 μm and more preferably 30 to 150 μm.

After applying the dispersion liquid, the thickness of the dispersion liquid may be precisely adjusted by covering the first substrate on which the dispersion liquid is applied with the second substrate. The dispersion liquid may have a film shape having a uniform thickness by such a very simple process.

In addition, it is preferable that at least one selected from the first substrate and the second substrate allows light to be transmitted therethrough to enable efficient photopolymerization of the multi-functional compound and is easily separated from the photonic crystal film. As a specific example, a glass plate may be used, but the present invention is not limited thereto.

In a case where the first substrate or the second substrate is not a transparent substrate, any substrate may be used as long as it is easily separated from the photonic crystal film.

Next, b) aging of the applied dispersion liquid at a temperature of 50° C. to lower than 200° C. may be performed. At this time, the aging means that the applied dispersion liquid is left at the same temperature for a certain time. Since the dispersion liquid according to an embodiment of the present invention includes no solvent, the heating is performed not for removing a solvent but for arranging the colloidal particles in an extremely precise and regular crystal lattice structure by aging the dispersion liquid at a temperature of 30° C. to lower than 200° C. and adequately adjusting a viscosity of the multi-functional compound.

To this end, an aging temperature is very important. It is preferable that the aging is performed at an aging temperature of preferably 30° C. to 150° C. and more preferably 30° C. to 100° C. In the above range, it is possible to form the crystal lattice structure in which the colloidal particles are regularly arranged with high precision. Accordingly, the manufactured photonic crystal film has a further excellent reflectance, such that the photonic crystal film may exhibit excellent visibility. Meanwhile, when the aging temperature is too low (lower than 30° C.), the precision of the crystal lattice structure of the colloidal particles may be somewhat degraded, and when the aging temperature is too high (higher than 200° C.), the multi-functional compound may be partially thermopolymerized and in this case, the regularity of the crystal lattice structure of the colloidal particles may be also degraded.

In addition, it is preferable that the aging is performed for a certain time or longer, and as a specific example, the aging may be performed for 10 minutes or longer. When the aging is performed shorter than 10 minutes, the precision of the crystal lattice structure of the colloidal particles may be somewhat degraded, and when performing light irradiation in the state, the maximum reflectance of the manufactured photonic crystal film may be decreased. It is preferable that the aging is performed for preferably 20 minutes or longer and more preferably 30 minutes or longer, in terms of significantly increasing the maximum reflectance of the manufactured photonic crystal film. In addition, the aging time may be adjusted depending on the aging temperature. In this case, an upper limit of the aging time is not particularly limited, but since the maximum reflectance is not further increased even though the aging is performed for the certain time or longer, when the aging is performed for the certain time or longer, the time and energy may be wasted and the multi-functional compound may be likely to be partially thermopolymerized, which is not preferable. In detail, the upper limit of the aging time may be hours or shorter, and it is preferable that the aging is performed for 60 minutes or shorter in terms of shortening the manufacturing time.

In addition, in a heating or cooling process to perform the aging, the aging may have a temperature profile within a specific range. Specifically, a heating rate may be 1° C./min to 10° C./min and preferably 5° C./min to 7° C./min up to a temperature range of 50° C. to lower than 200° C. In addition, in a case where a temperature control is required in the aging temperature range, a temperature control range may be −5° C. to 5° C. and preferably −3° C. to 3° C. In the above range, it is advantageous to achieve the effects of the present invention according to the aging.

Next, c) irradiating of the aged dispersion liquid with light to polymerize the dispersion liquid may be performed. The irradiating of the aged dispersion liquid with light to polymerize the dispersion liquid is the same as that described in the second aspect, and thus the descriptions of the type of light, light irradiation conditions, and the like will be omitted.

According to the third aspect of the present invention, it is preferable that the light irradiation may be performed at a temperature similar to the aging temperature. As a specific example, the light irradiation may be performed at a temperature condition of $TA-5 \leq TL \leq TA+5$ and it is preferable that the light irradiation is performed at the same temperature as the aging temperature. Here, TA is an aging temperature condition (° C.) and TL is a temperature condition (° C.) when performing light irradiation. As such, by adjusting the temperature of the aging similarly to the temperature of the light irradiation, it is possible to prevent the arrangement of the colloidal particles from being disordered due to a sharp change in temperature.

Thereafter, an additional process of separating the photonic crystal film manufactured between the first substrate and the second substrate and removing an unreacted product which is not cured may be also performed.

The present invention provides the photonic crystal film and the photonic crystal film manufactured by the method for manufacturing a photonic crystal film. The photonic crystal film may be used for a security element for preventing forgery of an anti-forgery article.

Still another aspect of the present invention provides an anti-forgery article comprising the photonic crystal film for a security element.

Specifically, the anti-forgery article may comprise an object article required for anti-forgery; and a photonic crystal film for a security element which is formed on one surface of the object article. That is, the anti-forgery article may have a structure in which the object article and the photonic crystal film for a security element are laminated. Alternatively, the photonic crystal film for a security element may be attached to one surface of the object article by a known lamination method. In this case, a polymer adhesive may be used to increase an adhesive strength between the object article and the photonic crystal film for a security element. The polymer adhesive is not particularly limited, and as an example, may be polyester, nylon, polyimide, polysiloxane, or polypropylene.

According to one aspect of the present invention, any object article may be used without particular limitation as long as it is required for anti-forgery. The object article may be a banknote, securities, an official document, a certification, an identification card, or a financial card.

Hereinafter, a photonic crystal film according to the present invention, a method for manufacturing the same, and an anti-forgery article comprising the same are described in detail with reference to Examples. However, the following Examples are only one reference example for describing the present invention in detail, and the present invention is not limited thereto and may be implemented in various forms. Unless otherwise defined, all technical terms and scientific terms used herein have the same meaning as commonly understood by a person skilled in the art to which the present invention belongs. The terms used herein are only for effectively describing a certain example rather than limiting the present invention. In addition, singular forms used in the specification and the appended claims may be intended to include plural forms unless interpreted otherwise in context. Further, unless otherwise stated in the specification, the unit of added materials may be wt %.

First, the following Examples 1 to 3 and Comparative Example 1 were carried out for manufacturing the photonic crystal films according to the first aspect and the second aspect.

EXAMPLE 1

A dispersion liquid was injected between two glass flat plates having a spaced distance of 50 μm at 80° C., the dispersion liquid was photocured by irradiating the dispersion liquid with UV (wavelength of 365 nm and output of 12 mW/cm²) for 7 seconds, and the two glass flat plates were removed, thereby manufacturing a photonic crystal film for a security element.

The dispersion liquid was prepared by mixing urethane acrylate (Miramer PU2100, viscosity at 25° C. of 6,700 cps, viscosity at 80° C. of 400 cps, weight average molecular weight of 1,400 g/mol, produced by Miwon Specialty Chemical Co., Ltd.) with silica nanoparticles having an average particle diameter of 200 nm and 2-hydroxy-2-methyl-1-phenyl-1-propanone (Darocur 1173), a volume ratio of the urethane acrylate to the silica nanoparticles was 67:33, and 1 wt % of Darocur 1173 which is a photoinitiator was added based on the urethane acrylate. In addition, at this time, a viscosity of the dispersion at 80° C. was 1000 cps.

EXAMPLE 2

All processes were carried out in the same manner as in Example 1 except for using urethane acrylate (Miramer PU5000, produced by Miwon Specialty Chemical Co., Ltd.) having a weight average molecular weight of 1,800 g/mol, a viscosity at 25° C. of 1,800 cps, and a viscosity at 80° C. of about 10 cps. In addition, at this time, a viscosity of the dispersion at 80° C. was about 30 cps.

EXAMPLE 3

All processes were carried out in the same manner as in Example 1 except for using urethane acrylate methacrylate (MAU, produced by Sigma-Aldrich Corporation) having a weight average molecular weight of 803 g/mol, a viscosity at 25° C. of 3,000 cps, and a viscosity at 80° C. of about 10 cps. In addition, at this time, a viscosity of the dispersion at 80° C. was about 30 cps.

COMPARATIVE EXAMPLE 1

All processes were carried out in the same manner as in Example 1 except for using ethoxylated trimethylolpropane triacrylate (ETPTA) (weight average molecular weight of 428 g/mol) as a prepolymer.

A reflectance in a wavelength region of 400 to 800 nm was measured by using the films manufactured in Examples 1 to 3 and Comparative Example 1. The results of Example 1 and Comparative Example 1 are shown in FIG. 1.

As a result, the measured maximum reflectance of each of the films manufactured in Examples 1 and 2 was about 50% almost similarly to the maximum reflectance of the photonic crystal film of Comparative Example 1 which is conventionally used, such that it was confirmed that the films manufactured in Examples 1 and 2 each had an excellent reflectance. It was confirmed from the above results that these films may be applied as a security element. In addition, a bend flexibility test that a film is bent in a range of more than 150° was carried out, and as a result, the films manufactured in Examples 1 to 3 had excellent flexibility, and in particular, the films manufactured in Examples 1 and 3 had very excellent flexibility enough to be foldable. On the other hand, since the film manufactured in Comparative Example 1 had insufficient flexibility, when a bending degree was increased, the film was cracked.

Next, the following Examples 4 to 7 and Comparative Examples 2 and 3 were carried out for manufacturing the photonic crystal films according to the third aspect.

EXAMPLE 4

The dispersion liquid was prepared by mixing ethoxylated trimethylolpropane triacrylate (ETPTA: molecular weight of 428 g/mol, viscosity at 25° C. of 60 cps) with silica nanoparticles having an average particle diameter of 170 nm and 2-hydroxy-2-methyl-1-phenyl-1-propanone (Darocur 1173), a volume ratio of the ETPTA to the silica nanoparticles was 67:33, and 1 wt % of Darocur 1173 which is a photoinitiator was added based on the ETPTA.

Next, the prepared dispersion liquid was dropped into a groove having a depth of 50 μm of a glass substrate, the glass substrate was covered with the other glass substrate, and then aging was performed in an oven of 70° C. for 30 minutes.

Thereafter, the aged dispersion liquid was irradiated with UV (wavelength of 365 nm and output of 12 mW/cm²) for 7 seconds to photopolymerize the aged dispersion liquid, and the two glass substrates were removed, thereby manufacturing a photonic crystal film having a thickness of 50 μm.

EXAMPLE 5

All processes were carried out in the same manner as in Example 1 except that the aging time was changed to 60 minutes.

EXAMPLE 6

All processes were carried out in the same manner as in Example 2 except that the aging temperature was changed to 120° C.

EXAMPLE 7

All processes were carried out in the same manner as in Example 2 except for using urethane acrylate (PUA, weight average molecular weight of 1,400 g/mol, produced by Miwon Specialty Chemical Co., Ltd.) instead of ETPTA.

COMPARATIVE EXAMPLE 2

All processes were carried out in the same manner as in Example 2 except that the aging was not performed.

COMPARATIVE EXAMPLE 3

All processes were carried out in the same manner as in Example 2 except that the aging temperature was changed to 200° C.

Figure 3:
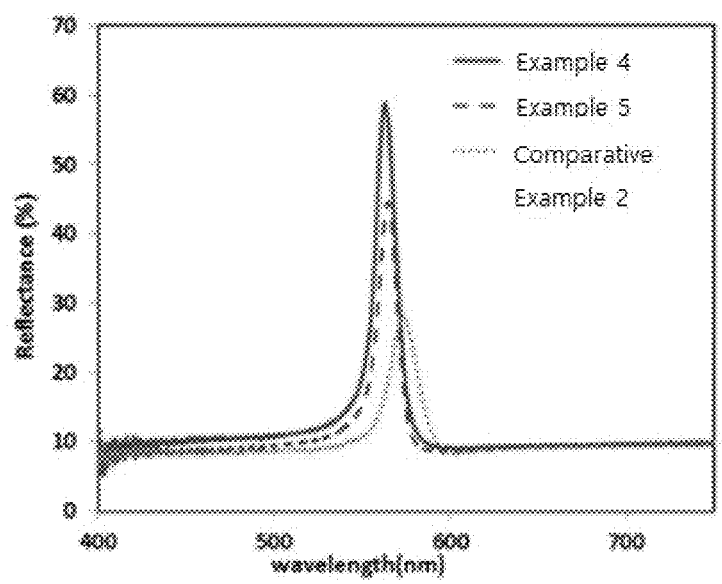
FIG. 3 illustrates the results obtained by measuring a reflectance (%) of the photonic crystal film according to Examples 4 and 5 and Comparative Example 2.

A reflectance in a wavelength region of 400 to 800 nm was measured by using the films manufactured in Examples 4 to 7 and Comparative Examples 2 and 3. The results are shown in FIG. 3 and Table 1.

TABLE 1

| | Multi-functional compound | Aging Condition | | Maximum reflectance (%) |
| --- | --- | --- | --- | --- |
| | | Temperature (° C.) | Time (min) | |
| Example 4 | ETPTA | 70 | 30 | 45 |
| Example 5 | ETPTA | 70 | 60 | 59 |
| Example 6 | ETPTA | 120 | 60 | 58 |
| Example 7 | PUA | 70 | 60 | 48 |
| Comparative Example 2 | ETPTA | 25 | 0 | 28 |
| Comparative Example 3 | ETPTA | 200 | 60 | — |

As a result, the photonic crystal film of Comparative Example 2 in which the aging was not performed at all had a somewhat low maximum reflectance of 28%. On the other hand, the photonic crystal film of Example 4 in which the aging was performed for 30 minutes had a significantly increased maximum reflectance of 45%. In addition, the photonic crystal film of Example 5 in which the aging was performed for 60 minutes had a very significantly increased maximum reflectance of 59%. In addition, the photonic crystal film of Example 6 in which the aging was performed for 60 minutes at 70° C. had a significantly increased maximum reflectance of 59%, and the photonic crystal film of Example 7 in which the aging was performed for 60 minutes at 120° C. had a significantly increased maximum reflectance of 58%. On the other hand, in Comparative Example 3, a reflection color was partially observed in a region of the film, but the reflection color was not observed over most of the region of the film, and a photonic crystal film was thus not formed. It is considered that it is because ETPTA was partially thermopolymerized before photopolymerization due to the too high aging temperature, the arrangement of the colloidal particles was thus significantly disordered.

As described above, it could be confirmed that the aging was performed in a specific temperature range, such that the silica particles were quickly arranged in a crystal lattice structure, thereby significantly increasing the maximum reflectance of the photonic crystal film, and also confirmed that when the photonic crystal film was applied as a security element, it is difficult to counterfeit, such that a strong security effect may be achieved.

While preferred embodiments of the present invention are provided as described above, it is obvious that various changes and modifications, and equivalents may be used in the present invention, and that the above embodiments may be suitably modified and equally applied. Therefore, the above descriptions do not limit the scope of the present invention, which is defined by the limitations of the following claims.

The invention claimed is:

1. A photonic crystal film comprising:
a polyurethane-based polymer matrix; and
colloidal particles dispersed in the polyurethane-based polymer matrix and arranged in a crystal lattice structure,
wherein the polyurethane-based polymer matrix is formed of a polyurethane-based prepolymer, and a viscosity of the polyurethane-based prepolymer at 80° C. is 100 to 1,000 cps.

2. The photonic crystal film of claim 1, wherein a maximum reflectance of the photonic crystal film is 10% or more.

3. The photonic crystal film of claim 1, wherein a thickness of the photonic crystal film is 10 to 200 μm.

4. The photonic crystal film of claim 1, wherein a weight average molecular weight of the polyurethane-based prepolymer is 500 to 30,000 g/mol.

5. The photonic crystal film of claim 1, wherein a difference between a refractive index of the polyurethane-based polymer matrix and a refractive index of the colloidal particles is 0.02 or more.

6. The photonic crystal film of claim 5, wherein the refractive index of the polyurethane-based polymer matrix is 1.4 to 1.5 and the refractive index of the colloidal particles is 1.3 to 2.95.

7. The photonic crystal film of claim 1, wherein an average particle diameter of the colloidal particles is 10 to 315 nm.

8. The photonic crystal film of claim 7, wherein the colloidal particles satisfy the following Relational Expression 1, Relational Expression 1

$$Da \times 0.95 \leq Ds \leq Da \times 1.05$$ Relational Expression 1

(in Relational Expression 1, Ds is a particle diameter (nm) of the colloidal particles and Da is an average particle diameter (nm) of the colloidal particles).

9. The photonic crystal film of claim 1, wherein the colloidal particles is one or two or more selected from metal nanoparticles, metal oxide nanoparticles, organic nanoparticles, and carbon structure nanoparticles.

10. The photonic crystal film of claim 1, wherein the photonic crystal film is used for a security element.

11. A method for manufacturing a photonic crystal film, the method comprising:
applying a dispersion liquid containing a polyurethane-based prepolymer, colloidal particles, and a photoinitiator on a substrate or injecting a dispersion liquid containing a polyurethane-based prepolymer, colloidal particles, and a photoinitiator between two parallel transparent flat plates, and irradiating the dispersion liquid with light
wherein a viscosity of the polyurethane-based prepolymer at 80° C. is 100 to 1,000 cps.

12. The method of claim 11, wherein the dispersion liquid is applied on the substrate or injected between the two transparent flat plates at a temperature of 60 to 100° C.

13. A method for manufacturing a photonic crystal film, the method comprising:
a) applying a dispersion liquid containing a polyurethane-based prepolymer, colloidal particles, and a photoinitiator on a first substrate and covering the first substrate on which the dispersion liquid is applied with a second substrate;
b) aging the applied dispersion liquid at a temperature of 30° C. to lower than 200° C.; and
c) irradiating the aged dispersion liquid with light to polymerize the dispersion liquid,
wherein at least one selected from the first substrate and the second substrate is a transparent substrate, and
wherein a viscosity of the polyurethane-based prepolymer at 80° C. is 100 to 1,000 cps.

14. The method of claim 13, wherein the aging is performed for 10 minutes or longer.

15. The method of claim 13, wherein the aging is performed at a temperature of 30° C. to 150° C.

16. The method of claim 13, wherein in the aging, the temperature is increased by 1° C./min to 10° C./min up to 30° C. to lower than 200° C.

17. An anti-forgery article comprising the photonic crystal film of claim 1.

* * * * *